(12) United States Patent
Kuusela

(10) Patent No.: US 9,807,416 B2
(45) Date of Patent: Oct. 31, 2017

(54) LOW-LATENCY TWO-PASS VIDEO CODING

(71) Applicant: Google Inc., Mountain View, CA (US)

(72) Inventor: Aki Kuusela, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 69 days.

(21) Appl. No.: 14/859,785

(22) Filed: Sep. 21, 2015

(65) Prior Publication Data

US 2017/0085915 A1     Mar. 23, 2017

(51) Int. Cl.
*H04N 19/527* (2014.01)
*H04N 19/139* (2014.01)
*H04N 19/194* (2014.01)
*H04N 19/196* (2014.01)
*H04N 19/40* (2014.01)
*H04N 19/176* (2014.01)
*H04N 19/30* (2014.01)
*H04N 19/513* (2014.01)
*H04N 19/59* (2014.01)
*H04N 19/423* (2014.01)
*H04N 19/53* (2014.01)

(52) U.S. Cl.
CPC ......... *H04N 19/527* (2014.11); *H04N 19/139* (2014.11); *H04N 19/176* (2014.11); *H04N 19/194* (2014.11); *H04N 19/196* (2014.11); *H04N 19/30* (2014.11); *H04N 19/40* (2014.11); *H04N 19/513* (2014.11); *H04N 19/59* (2014.11); *H04N 19/423* (2014.11); *H04N 19/53* (2014.11)

(58) Field of Classification Search
CPC .. H04N 19/527; H04N 19/139; H04N 19/194; H04N 19/196
See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,337,086 A | 8/1994 | Fujinami | |

(Continued)

FOREIGN PATENT DOCUMENTS

| | | | |
|---|---|---|---|
| EP | 0634873 A2 | 1/1995 | |
| EP | 0806866 A2 | 11/1997 | |

(Continued)

OTHER PUBLICATIONS

Wiegand, Thomas, et al.; Long-Term Memory Motion-Compensated Prediction, date unknown.

(Continued)

*Primary Examiner* — Nam Pham
(74) *Attorney, Agent, or Firm* — Young Basile Hanlon & MacFarlane, P.C.

(57) ABSTRACT

Low-latency two-pass video coding may include identifying an input frame from an input video stream, determining a reduced frame from the input frame, the reduced frame having a size smaller than a size of the input frame, encoding the reduced frame using a first encoder, generating a plurality of encoding parameters based on encoding the reduced frame, generating an encoded frame by encoding the input frame using the first encoder and the plurality of encoding parameters, including the first encoded frame in an output bitstream, and storing or transmitting the output bitstream.

17 Claims, 10 Drawing Sheets

(56) References Cited

U.S. PATENT DOCUMENTS

| | | |
|---|---|---|
| 5,512,952 A | 4/1996 | Iwamura |
| 5,537,155 A | 7/1996 | O'Connell et al. |
| 5,675,384 A | 10/1997 | Ramamurthy et al. |
| 5,719,642 A | 2/1998 | Lee |
| 5,731,840 A | 3/1998 | Kikuchi et al. |
| 5,886,742 A | 3/1999 | Hibi et al. |
| 5,991,447 A | 11/1999 | Eifrig et al. |
| 6,005,980 A | 12/1999 | Eifrig et al. |
| 6,141,053 A | 10/2000 | Saukkonen |
| 6,236,682 B1 | 5/2001 | Ota et al. |
| 6,272,179 B1 | 8/2001 | Kadono |
| 6,289,049 B1 | 9/2001 | Kim et al. |
| 6,324,540 B1 | 11/2001 | Khanna et al. |
| 6,330,344 B1 | 12/2001 | Kondo et al. |
| 6,359,929 B1 | 3/2002 | Boon |
| 6,381,277 B1 | 4/2002 | Chun et al. |
| 6,385,245 B1 | 5/2002 | De Haan et al. |
| 6,404,738 B1 | 6/2002 | Reininger et al. |
| 6,411,602 B2 | 6/2002 | Schoenblum et al. |
| 6,449,312 B1 | 9/2002 | Zhang et al. |
| 6,456,591 B1 | 9/2002 | Mishra |
| 6,483,874 B1 | 11/2002 | Panusopone et al. |
| 6,535,238 B1 | 3/2003 | Kressin |
| 6,700,934 B2 | 3/2004 | Lin |
| 6,711,211 B1 | 3/2004 | Lainema |
| 6,721,327 B1 | 4/2004 | Ekudden et al. |
| 6,771,703 B1 | 8/2004 | Oguz et al. |
| 6,937,770 B1 | 8/2005 | Oguz et al. |
| 7,010,037 B2 | 3/2006 | Ye et al. |
| 7,065,004 B2 | 6/2006 | Jiao et al. |
| 7,450,640 B2 | 11/2008 | Kim et al. |
| 7,584,475 B1 | 9/2009 | Lightstone et al. |
| 7,843,995 B2 | 11/2010 | Bhaskaran et al. |
| 7,983,493 B2 | 7/2011 | Zhang |
| 7,997,953 B2 | 8/2011 | Kamiya et al. |
| 8,175,161 B1 | 5/2012 | Anisimov |
| 8,204,114 B2 | 6/2012 | Wang et al. |
| 8,224,100 B2 | 7/2012 | Jeong |
| 8,948,529 B1 | 2/2015 | Maaninen |
| 9,014,265 B1 | 4/2015 | Rintaluoma |
| 9,210,424 B1 | 12/2015 | Rintaluoma et al. |
| 2002/0009149 A1 | 1/2002 | Rodriguez et al. |
| 2002/0031272 A1 | 3/2002 | Bagni et al. |
| 2002/0039386 A1 | 4/2002 | Han et al. |
| 2002/0146071 A1 | 10/2002 | Liu et al. |
| 2002/0159525 A1 | 10/2002 | Jeong |
| 2003/0007566 A1 | 1/2003 | Peng et al. |
| 2003/0012275 A1 | 1/2003 | Boice et al. |
| 2003/0035477 A1 | 2/2003 | Sekiguchi et al. |
| 2003/0206592 A1 | 11/2003 | Srinivasan et al. |
| 2005/0053295 A1 | 3/2005 | Holcomb |
| 2005/0123054 A1 | 6/2005 | Wang et al. |
| 2005/0220444 A1 | 10/2005 | Ohkita et al. |
| 2006/0008038 A1 | 1/2006 | Song et al. |
| 2006/0062481 A1 | 3/2006 | Suvanto |
| 2006/0093036 A1 | 5/2006 | Park et al. |
| 2006/0114993 A1 | 6/2006 | Xiong et al. |
| 2006/0126729 A1 | 6/2006 | Nakayama |
| 2006/0200733 A1 | 9/2006 | Stankovic et al. |
| 2006/0222078 A1 | 10/2006 | Raveendran |
| 2006/0285598 A1 | 12/2006 | Tulkki |
| 2007/0009034 A1 | 1/2007 | Tulkki |
| 2007/0036215 A1 | 2/2007 | Pan et al. |
| 2007/0071356 A1 | 3/2007 | Caviedes et al. |
| 2007/0140352 A1 | 6/2007 | Bhaskaran et al. |
| 2008/0046249 A1 | 2/2008 | Thyssen et al. |
| 2008/0089409 A1 | 4/2008 | Xu et al. |
| 2008/0123754 A1 | 5/2008 | Ratakonda et al. |
| 2008/0152258 A1 | 6/2008 | Tulkki |
| 2008/0225735 A1 | 9/2008 | Qiu et al. |
| 2008/0228735 A1 | 9/2008 | Kenedy et al. |
| 2008/0240246 A1 | 10/2008 | Lee et al. |
| 2008/0240254 A1 | 10/2008 | Au et al. |
| 2008/0304763 A1 | 12/2008 | Nagori |
| 2009/0021588 A1 | 1/2009 | Border et al. |
| 2009/0052534 A1 | 2/2009 | Wang et al. |
| 2009/0067495 A1 | 3/2009 | Au et al. |
| 2009/0225834 A1 | 9/2009 | Song et al. |
| 2009/0271814 A1 | 10/2009 | Bosscha |
| 2010/0027622 A1 | 2/2010 | Dane |
| 2010/0086029 A1 | 4/2010 | Chen et al. |
| 2010/0208802 A1 | 8/2010 | Tsukuba et al. |
| 2010/0220180 A1 | 9/2010 | Lee et al. |
| 2010/0238268 A1 | 9/2010 | Tulkki |
| 2010/0246665 A1 | 9/2010 | Brederson et al. |
| 2010/0284464 A1 | 11/2010 | Nagori et al. |
| 2011/0001643 A1 | 1/2011 | Sze et al. |
| 2011/0292997 A1 | 12/2011 | An et al. |
| 2012/0014615 A1 | 1/2012 | Yang et al. |
| 2012/0128069 A1 | 5/2012 | Sato |
| 2012/0134496 A1 | 5/2012 | Farkash et al. |
| 2012/0213448 A1 | 8/2012 | Malmborg et al. |
| 2012/0294376 A1 | 11/2012 | Tanaka et al. |
| 2013/0022119 A1 | 1/2013 | Chien et al. |
| 2013/0156098 A1* | 6/2013 | Schwartz ............ H04N 19/172 375/240.03 |
| 2013/0195188 A1 | 8/2013 | Sugio et al. |
| 2014/0286430 A1 | 9/2014 | Lee et al. |
| 2014/0376618 A1 | 12/2014 | Ma et al. |

FOREIGN PATENT DOCUMENTS

| | | |
|---|---|---|
| EP | 1578116 A1 | 9/2005 |
| FI | 115945 B | 8/2005 |
| WO | 9611457 A1 | 4/1996 |
| WO | 02062072 A1 | 8/2002 |
| WO | 02067590 A1 | 8/2002 |
| WO | 02078327 A1 | 10/2002 |
| WO | 03043342 A1 | 5/2003 |
| WO | 2006-099226 A1 | 9/2006 |
| WO | 2008051517 A2 | 5/2008 |

OTHER PUBLICATIONS

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wikipedia, the free encyclopedia, "Application-specific integrated circuit", http://en.wikipedia.org/wiki/Application-specific_integrated_circuit, 7 pp (Jun. 27, 2012).

Wright, R. Glenn, et al.; "Multimedia—Electronic Technical Manual for ATE", IEEE 1996, 3 pp.

Zhang, Kui, et al.; "Variable Block Size Video Coding With Motion Prediction and Motion Segmentation", SPIE vol. 2419, 1995, 9 pp.

Hongliang Li; King Ngi Ngan; Zhenyu Wei, "Fast anad Efficient Method for Block Edge Classification and its Application in H.264/AVC Video Coding." Circuits and Systems for Video Technology, IEEE Transactions on, vol. 18, No. 6, pp. 756, 768, Jun. 2008.

Trista Pei-Chun Chen and Tsuhan Chen, Second-Generation Error Concealment for Video Transport Over Error Prone Channels, electrical computer Engineering, Carnegie Mellon University, Pittsburgh, PA 15213, U.S.A., Proceedings of the 2002 International Conference on Image Processing, vol. 1, pp. 1-25-1-28 (IEEE 2002).

Qiang, Peng, T. Yang, and C Zhu, Block-based temporal error concealment for video packet using motion vector extrapolation, 2002 International Conference on Communications, Circuits and Systems and West Sino Exposition Proceedings, 10-14 vol. 1:2.

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Chen, Michael C., et al.; "Design and Optimization of a Differentially Coded Variable Block Size Motion Compensation System", IEEE 1996, 4 pp.

(56) References Cited

OTHER PUBLICATIONS

Chen, Xing C., et al.; "Quadtree Based Adaptive Lossy Coding of Motion Vectors", IEEE 1996, 4 pp.
Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.
Ferzli, R., et al.; "No-Reference Objective Wavelet Based Noise Immune Image Sharpness Metric", IEEE International Conference on Image Processing, ICIP 2005, IEEE< Piscataway, NJ, USA, vol. 1, Sep. 11, 2005, pp. 405-408.
Ghanbari Mohammad, "Postprocessing of Late Calls for Packet Video", IEEE Transactions on Circuits and Systems for Video Technology, vol. 6, No. 6, Dec. 1996, 10 pages.
Guillotel, Philippe, et al.; "Comparison of motion vector coding techniques", SPIE vol. 2308, 1994, 11 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Jang, C. Cho, H-G., Automated Digital Photo Classification by Tessellated Unit Block Alignment, Proceedings of the International Conference on Convergence and Hybrid Information Technology 2008 (ICHIT 2008), Aug. 28-29, 2008, pp. 204 to 210, Daejon, South Korea, XP 031319705.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp. (Abstract only).
Latecki, Longin Jan; "Image Similarity", Graduate Course: Computer Graphics and Image Processing, Sep. 27, 2004 (XP-002694202), Temple University, Philadelphia, retrieved from the Internet: URL:http://www.cis.temple.edu/~latecki/Courses/CIS601-04/lectures_fall04.htm [retrieved on Mar. 15, 2013], Slides 5-8.
Liu, Bede, et al.; "A simple method to segment motion field for video coding", SPIE vol. 1818, Visual Communications and Image Processing 1992, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Mozilla, "Introduction to Video Coding Part 1: Transform Coding", Video Compression Overview, Mar. 2012, 171 pp.
Multi-core processor, Wikipedia, the free encyclopedia. Http://wikipedia.org/wiki/Multi-core_processor; dated Apr. 30, 2012.
Murat A. Tekalp, Block-Based Methods, Digital Video Processing, Prentice Hall Processing Series, Aug. 12, 1995, pp. 98-116, Prentice Hall PTR.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on circuits and Systems for Video Technology, vol. 3, No. 1, Feb. 1993, 17 pp.

Overview; VP7 Data Format and Decoder. Version 1.5. On2 Technologies, Inc. Dated Mar. 28, 2005.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services- Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Sunil Kumar Liyang Xu, Mrinal K Man Dal, and Sethuraman PAncHANATHAN, Error Resiliency Schemes in H.264/AVC Standard, Elsevier J. of Visual Communication & Image Representation (Special issue on Emerging H.264/AVC Video Coding Standard), vol. 17 (2), Apr. 2006.
Tasdizen, et al; "A High Performance Reconfigurable Motion Estimation Hardware Architecture", Design, Automation & Test in Europe Conference & Exhibition, Apr. 20, 2009, IEEE, Piscataway, NJ, US pp. 882-885.
Tsai et al., "Effective Subblock-Based and Pixel-Based Fast Direction Detections for H.264 Intra Prediction" in IEEE Transactions on Circuits and Systems for Video Technology, Vol. 18, No. 7, July 2008.
Vasudev Bhaskaran et al., "Chapter 6: The MPEG Video Standards", Image and Video Compression Standards—Algorithms & Architectures, Second Edition, 1997, pp. 149-230 Kluwer Academic Publishers.
Vos, Luc De and Stegherr, Michael; "Parameterizable VLSI Architectures for the Full-Search Block-Matching Algorithm", IEEE Transactions on Circuits and Systems, vol. 36, No. 10, Oct. 1989 NY US pp. 1309-1316.
VP6 Bitstream & Decoder Specification. Version 1.02. On2 Technologies, Inc. Dated Aug. 17, 2006.

(56) References Cited

OTHER PUBLICATIONS

VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Ebrahimi, Touradj, et al.; "Joint motion estimation and segmentation for very low bitrate video coding", SPIE vol. 2501, 1995, 12 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Wang, Yao "Error Control and Concealment for Video Communication: A Review", Proceedings of the IEEE, vol. 86, No. 5, May 1998, 24 pages.
WebM Project, WebM Video Hardware RTLs, http://www.webmproject.org/hardware/, 3 pp, (Jun. 27, 2012).
Dongdong Zhu et al. "Fast inter prediction mode decision for H.264"; 2004 IEEE International Conference on Multimedia and Expo; Jun. 27-30, 2004; Taipei, Taiwan, IEEE Operations Center, Piscataway, NJ; vol. 2; Jun. 27, 2004; pp. 1123-1126.
International Search Report and Written Opinion for International Patent Application No. PCT/US2013/040171; dated Nov. 25, 2016; pp. 1-20.

\* cited by examiner

LOW-LATENCY TWO-PASS VIDEO CODING

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for encoding and decoding using low-latency two-pass video coding.

An aspect is a method for video coding using low-latency two-pass video coding. Video coding using low-latency two-pass video coding may include identifying an input frame from an input video stream, determining a reduced frame from the input frame, the reduced frame having a size smaller than a size of the input frame, encoding the reduced frame using a first encoder, generating a plurality of encoding parameters based on encoding the reduced frame, generating an encoded frame by encoding the input frame using the first encoder and the plurality of encoding parameters, including the first encoded frame in an output bitstream, and storing or transmitting the output bitstream.

Another aspect is a method for video coding using low-latency two-pass video coding. In some implementations, video coding using low-latency two-pass video coding may include identifying an input frame from an input video stream, wherein the input frame includes an input block, determining a reduced frame from the input frame, the reduced frame having a size smaller than a size of the input frame, wherein the reduced frame includes a reduced block spatially corresponding to at least a portion of the input block, encoding, by a first encoder, the reduced frame, wherein encoding the reduced frame includes identifying a motion vector for encoding the reduced block, generating, by the first encoder, an encoded frame by encoding the input frame, wherein encoding the input frame includes, on a condition that the motion vector exceeds a motion threshold, using a motion search area for motion estimation for the input block, wherein the motion search area is identified based on the motion vector, including the encoded frame in an output bitstream, and storing or transmitting the output bitstream.

Another aspect is a method for video coding using low-latency two-pass video coding. In some implementations, video coding using low-latency two-pass video coding may include identifying an input frame from an input video stream, determining a reduced frame from the input frame, the reduced frame having a size smaller than a size of the input frame, wherein determining the reduced frame from the input frame includes cropping the input frame, scaling the input frame, or cropping and scaling the input frame, encoding, using a first encoder, the reduced frame, wherein encoding the reduced frame includes generating a plurality of encoding metrics, generating at least one encoding parameter based on the plurality of encoding metrics, generating, using the first encoder, an encoded frame by encoding the input frame using the at least one encoding parameter, including the first encoded frame in an output bitstream, and storing or transmitting the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Encoding a sequence of video frames may include making various coding decisions, such as whether to encode a frame independently, as an intra-coded frame, or differentially, as an inter-coded frame, balancing accuracy, or the degree to which a decoded frame matches the corresponding input frame, compression, speed, and resource utilization. Some coding decisions may be based on coding parameters provided to the encoder before or during the encoding process. In some implementations, such as in a single-pass encoder, some coding parameters may be determined independently of the frame being encoded, which may reduce the efficiency, quality, or both of the video coding.

In some implementations, video coding may include two-pass video coding, wherein an input frame may be encoded using a first-pass to identify information, such as coding parameters, for encoding the input frame, and a second-pass using the information identified by the first-pass to improve coding quality and efficiency. In some implementations, such as implementations for use in real-time video coding, two-pass video coding may be unavailable because two-pass video coding may more than double the resource utilization of single-pass video coding. For example, two-pass video coding may utilize more time, or latency, to encode each frame as single-pass video coding. In another example, a two-pass video coder may utilize twice the number of hardware encoders as a single-pass video coder.

In some implementations, low-latency two-pass video coding may improve the encoding quality relative to single-pass video coding and may minimize latency and hardware utilization. Low-latency two-pass video coding may include using a single hardware encoder to perform two-pass video coding and reducing latency by performing first-pass coding using a reduced size frame. In some implementations, low-latency two-pass video coding may include using motion information generated by the first-pass coding to improve the accuracy of motion estimation during second-pass coding.

Figure 1:
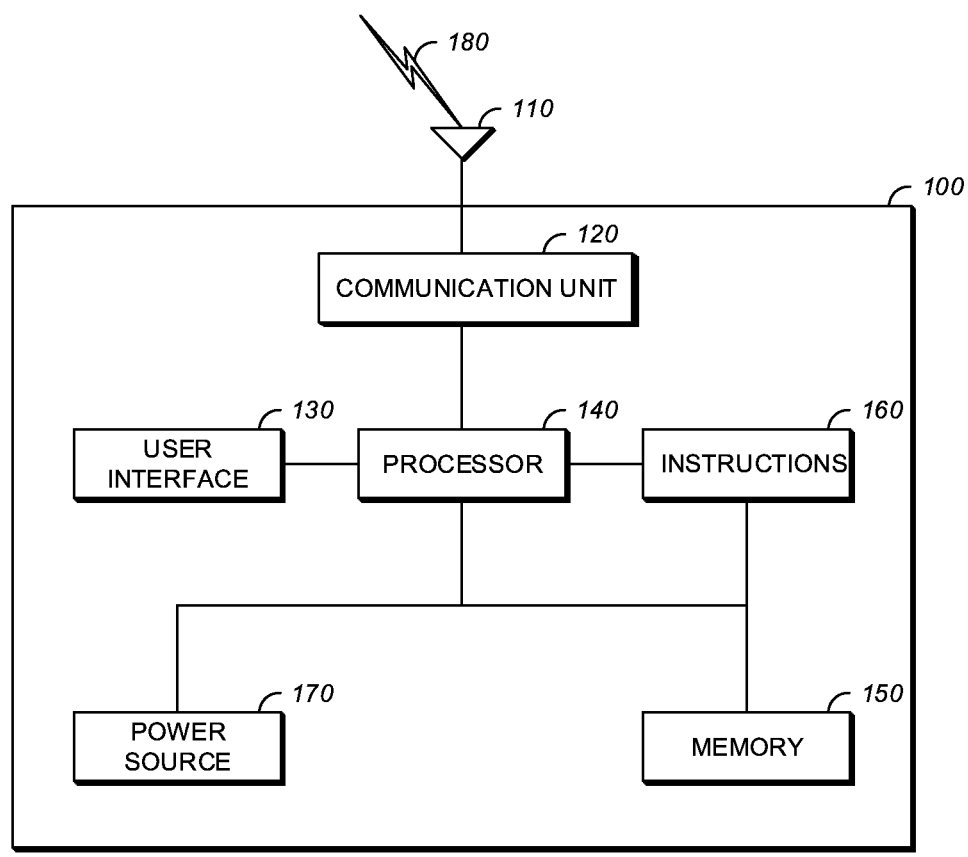
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a special purpose processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
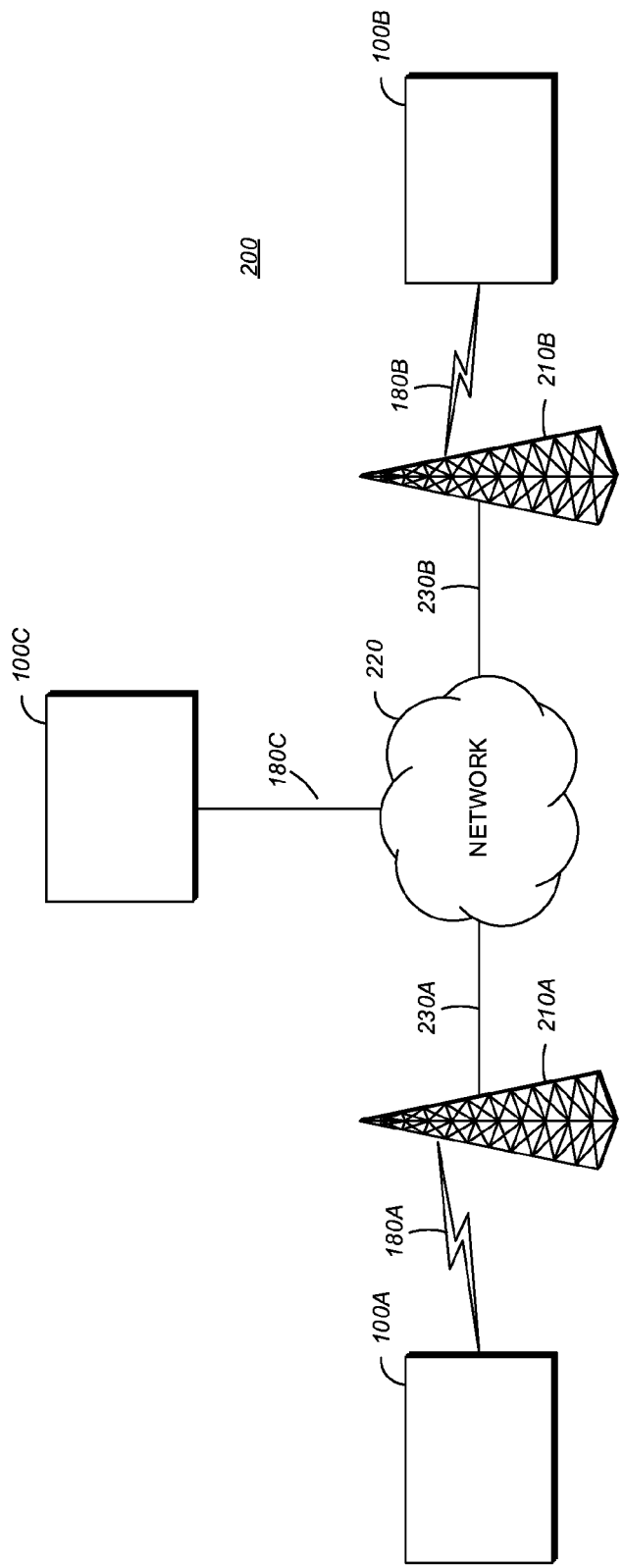
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
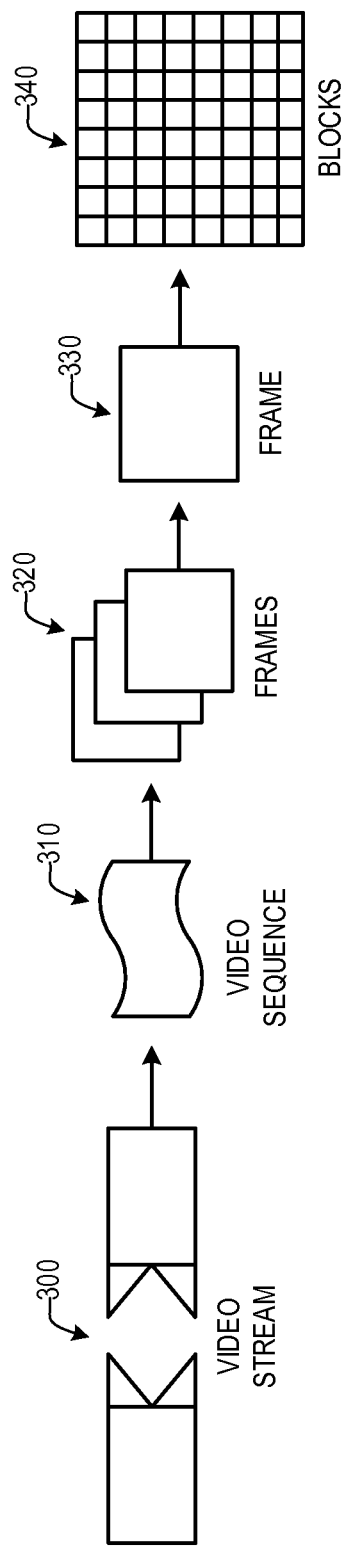
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
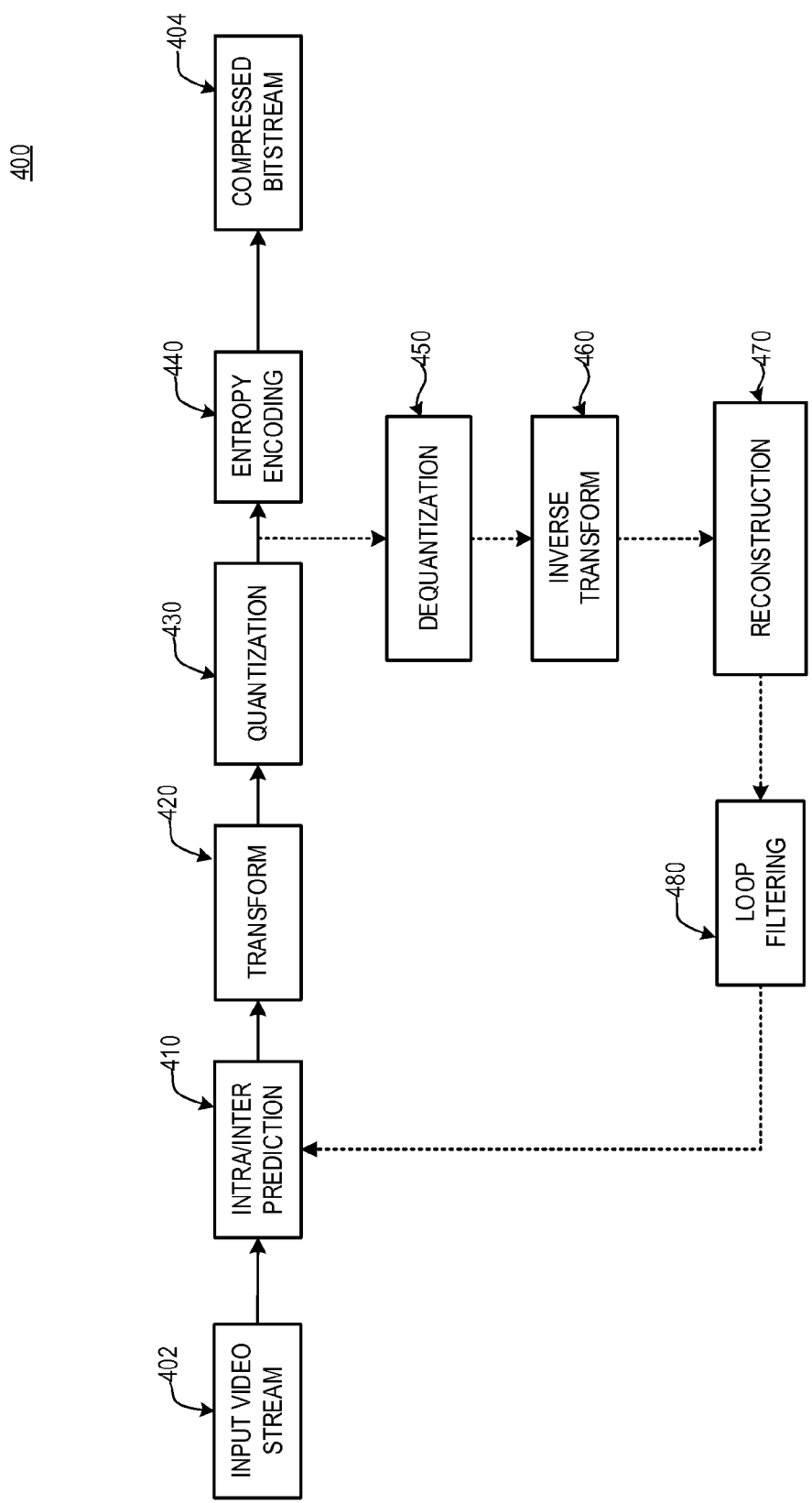
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
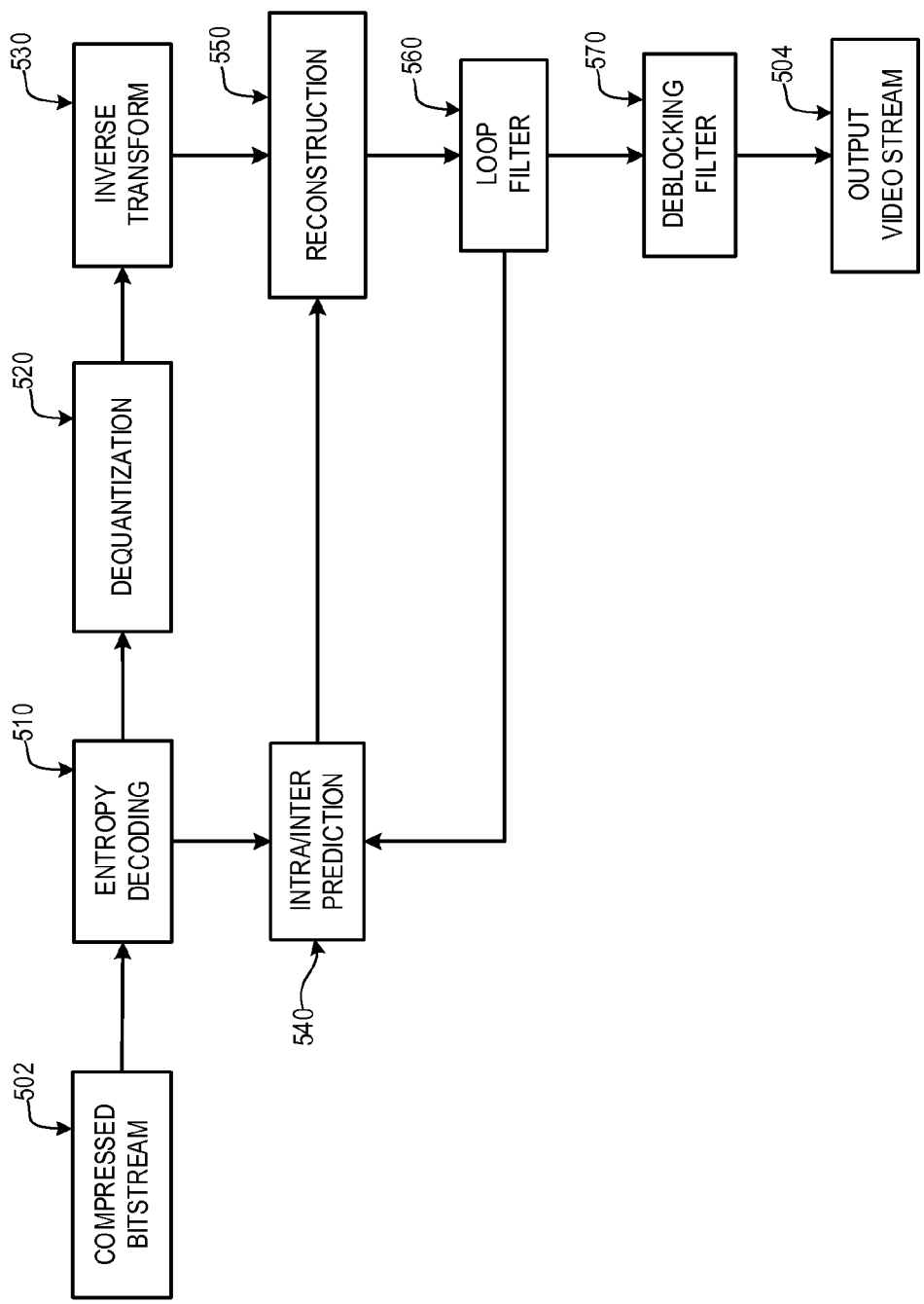
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
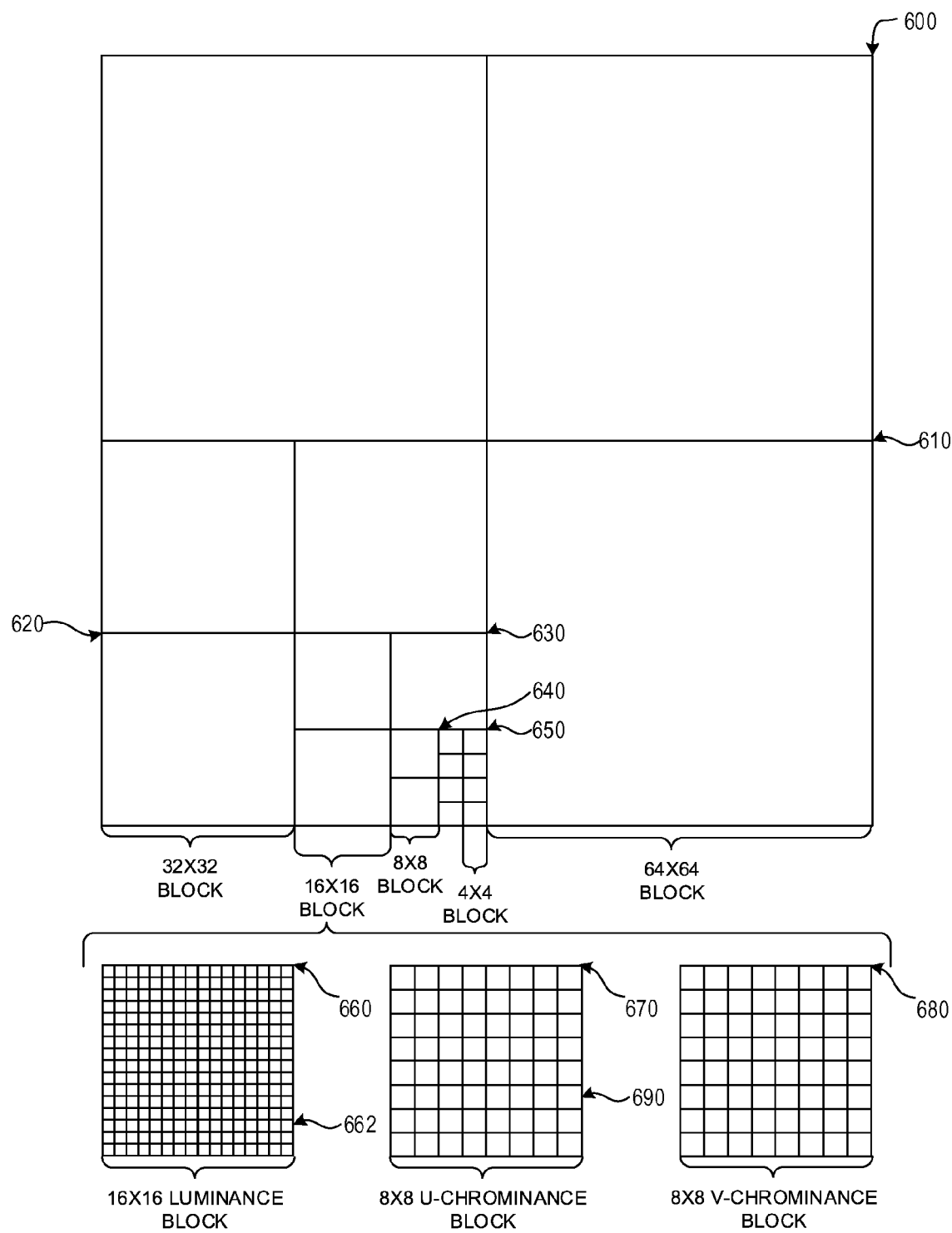
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×z32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block based coding efficiency may be improved by partitioning blocks into one or more partitions, which may be rectangular, including square, partitions. In some implementations, video coding using partitioning may include selecting a partitioning scheme from among multiple candidate partitioning schemes. For example, in some implementations, candidate partitioning schemes for a 64×64 coding unit may include rectangular size partitions ranging in sizes from 4×4 to 64×64, such as 4×4, 4×8, 8×4, 8×8, 8×16, 16×8, 16×16, 16×32, 32×16, 32×z32, 32×64, 64×32, or 64×64. In some implementations, video coding using partitioning may include a full partition search, which may include selecting a partitioning scheme by encoding the coding unit using each available candidate partitioning scheme and selecting the best scheme, such as the scheme that produces the least rate-distortion error.

In some implementations, encoding a video frame may include identifying a partitioning scheme for encoding a current block, such as block 610. In some implementations, identifying a partitioning scheme may include determining whether to encode the block as a single partition of maximum coding unit size, which may be 64×64 as shown, or to partition the block into multiple partitions, which may correspond with the sub-blocks, such as the 32×32 blocks 620 the 16×16 blocks 630, or the 8×8 blocks 640, as shown, and may include determining whether to partition into one or more smaller partitions. For example, a 64×64 block may be partitioned into four 32×32 partitions. Three of the four 32×32 partitions may be encoded as 32×32 partitions and the fourth 32×32 partition may be further partitioned into four 16×16 partitions. Three of the four 16×16 partitions may be encoded as 16×16 partitions and the fourth 16×16 partition may be further partitioned into four 8×8 partitions, each of which may be encoded as an 8×8 partition. In some implementations, identifying the partitioning scheme may include using a partitioning decision tree.

In some implementations, video coding for a current block may include identifying an optimal coding mode from multiple candidate coding modes, which may provide flexibility in handling video signals with various statistical properties, and may improve the compression efficiency. For example, a video coder may evaluate each candidate coding mode to identify the optimal coding mode, which may be, for example, the coding mode that minimizes an error metric, such as a rate-distortion cost, for the current block. In some implementations, the complexity of searching the candidate coding modes may be reduced by limiting the set of available candidate coding modes based on similarities between the current block and a corresponding prediction block. In some implementations, the complexity of searching each candidate coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

Figure 7:
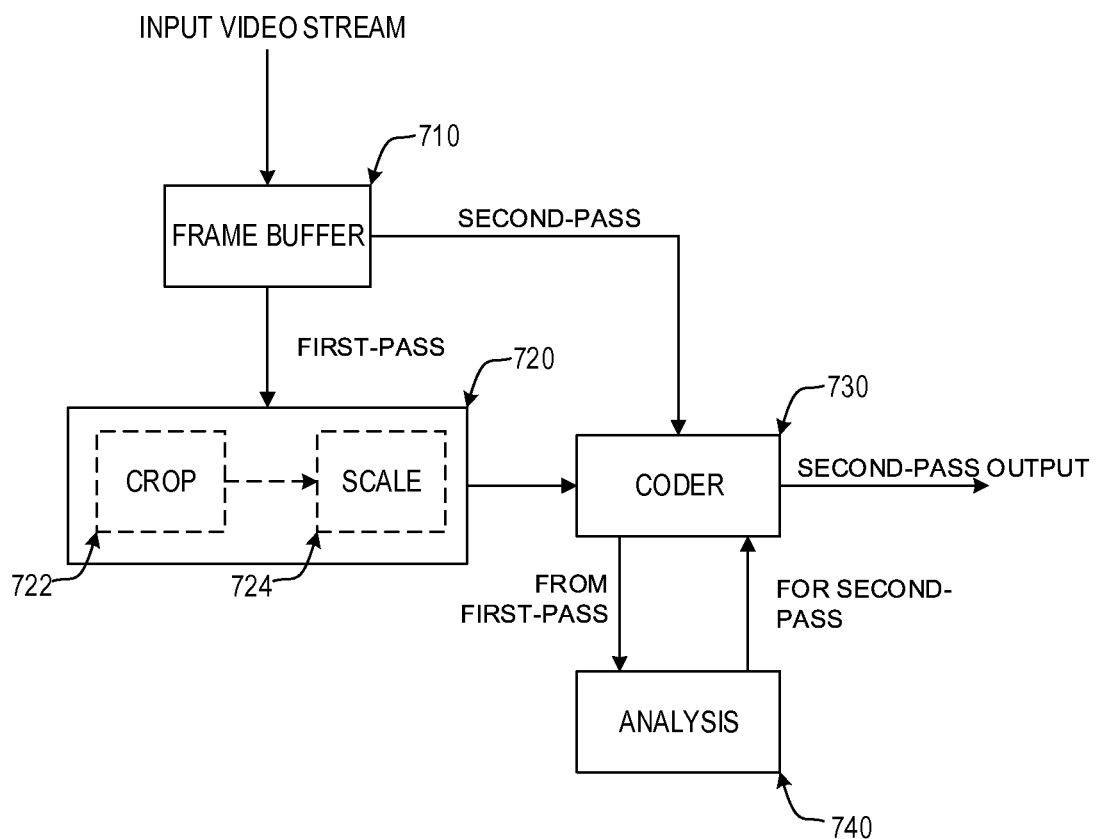
FIG. 7 is a block diagram of a low-latency two-pass video coding unit in accordance with implementations of this disclosure.

FIG. 7 is a block diagram of a low-latency two-pass video coding unit 700 in accordance with implementations of this disclosure. The low-latency two-pass video coding unit 700 can be implemented in a device, such as the computing device 100 shown in FIG. 1 or the computing and communication devices 100A/100B/100C shown in FIG. 2. For example, the encoder 400 shown in FIG. 4 may include the low-latency two-pass video coding unit 700 shown in FIG. 7.

In some implementations, the low-latency two-pass video coding unit 700 may include a frame buffer 710, first-pass resizing unit 720, a coding unit 730, an analysis unit 740, or a combination thereof, and may perform low-latency two-pass video coding using a single coding unit 730. For example, the low-latency two-pass video coding unit 700 may low-latency two-pass encode video in real-time.

The frame buffer 710 may receive and store one or more frames from an input video sequence, such as the input video sequence 402 shown in FIG. 4. In some implementations, the number, or cardinality, of input frames received and stored at the frame buffer 710 may be determined based on a defined buffer value. In some implementations, the defined buffer value may be based on a latency threshold.

The first-pass resizing unit 720 may receive an input frame from the frame buffer 710 and may generate a reduced frame based on the input frame. In some implementations, the resizing unit 720 may include a cropping unit 722. The cropping unit 722 may generate the reduced frame by cropping the input frame. For example, the input frame may be a N×M frame, and the cropping unit 722 may identify a $$\frac{N}{2} \times \frac{M}{2}$$

portion of the input frame, such as a portion at the center of the input frame, as the reduced frame. A cropped reduced frame may include a full resolution portion of the input frame spatially smaller than the input frame.

In some implementations, the resizing unit 720 may include a scaling unit 724. The scaling unit 724 may generate the reduced frame by scaling, or sub-sampling, the input frame. A scaled reduced frame may include a lower resolution representation of the input frame, which may be spatially concurrent with the input frame. In some implementations, subsampling, or scaling, may include receiving the full input frame. For example, the input frame may be a 2160 p frame, and the sub-sampling may generate a 1080p reduced frame, which may include using 270 megabytes ((3840×2160×1.5−1920×1080×1.5)*30) of memory bandwidth per frame.

In some implementations, the resizing unit 720 may include the cropping unit 722 and the scaling unit 724. In some implementations, low-latency two-pass video coding may include determining whether to generate the reduced frame using the cropping unit 722, the scaling unit 724, or both. For example, low-latency two-pass video coding may include generating the reduced frame by cropping the input frame to identify a $$\frac{3N}{4} \times \frac{3M}{4}$$

cropped portion of the input frame and using the scaling unit 724 to sub-sample the a $$\frac{3N}{4} \times \frac{3M}{4}$$

cropped portion, to generate a reduced frame that is smaller than the input frame spatially and has a lower resolution.

Although shown separately, in some implementations, the cropping unit 722 and the scaling unit 724 may be implemented as a combined cropping and scaling unit. In some implementations, the resizing unit 720 may include the cropping unit 722 and omit the scaling unit 724 or the resizing unit 720 may omit the cropping unit 722 and include the scaling unit 724.

In some implementations, the coder 730 may first-pass encode the reduced frame generated by the resizing unit 720. Encoding the reduced frame generated by the resizing unit 720 may include identifying encoding metrics, such as one or more coding statistics, based on encoding the reduced frame generated by the resizing unit 720. For example, identifying the encoding metrics may include identifying a global motion vector for encoding the reduced frame generated by the resizing unit 720, identifying a cardinality of a plurality of intra-coded blocks for encoding the reduced frame generated by the resizing unit 720, identifying a motion vector field uniformity metric for encoding the reduced frame generated by the resizing unit 720, identifying a cardinality of a plurality of skipped blocks for encoding the reduced frame generated by the resizing unit 720, identifying a cardinality of a plurality of zero-motion blocks for encoding reduced frame generated by the resizing unit 720, identifying a distribution of reference frames for encoding the reduced frame generated by the resizing unit 720, or any other coding metric, or combination of coding metrics identifiable based on encoding the reduced frame generated by the resizing unit 720. For example, the motion vector field uniformity metric may indicate whether inter-frame motion corresponds with uniform motion, such as panning motion. In some implementations, identifying the coding metrics based on encoding the reduced frame generated by the resizing unit 720 may include identifying one or more motion vectors corresponding to one or more blocks of the reduced frame generated by the resizing unit 720.

In some implementations, the analysis unit 740 may evaluate the first-pass coding metrics identified by the coder 730 first-pass encoding the reduced frame. In some implementations, evaluating the first-pass coding metrics may include determining one or more encoding parameters for second-pass encoding the input frame by the coding unit 730.

The coding unit 730 may receive the input frame from the frame buffer 710, may receive the second-pass coding parameters from the analysis unit 740, and may second-pass encode the input frame using the second-pass coding parameters. Encoding the input frame in a second-pass using coding parameters determined based on encoding the reduced frame in a first-pass may improve coding quality for encoding the input frame.

In some implementations, the first-pass encoding may include generating a motion vector field, generating the first-pass coding metrics may include identifying motion vector length statistics corresponding to the motion vector field, and the analysis unit 740, the coder 730, or a combination thereof, may adjust the motion vector length statistics based on the size of the reduced size frame relative to the input frame. In some implementations, the motion vector length statistics may be scaled inversely proportional to the reduction in size performed by the resizing unit 720. For example, the resizing unit may generate the reduced size frame at 50% of the size of the input frame, and a motion vector length of 4 may be up-scaled to 8.

In some implementations, video coding, such as first-pass encoding, second-pass encoding, or both, may include motion estimation, which may include motion searching. Motion searching may include identifying a current block of a current frame for encoding, searching a portion of a reference frame for a reference block that most closely matches the current block, and identifying a motion vector for the current block based on a spatial difference between the location of the current block in the current frame and the location of the reference block in the reference frame. The portion of the reference frame searched may include a candidate reference block from the reference frame having a location spatially corresponding to the current block in the input frame, and may include blocks neighboring the candidate reference block in the reference frame. In some implementations, motion between the reference frame and the current frame may exceed the size of the search area, and the motion estimation may not efficiently identify an accurate reference block for the current block.

In some implementations, low-latency two-pass video coding may improve coding efficiency for frames representing motion that exceeds the motion search area size. In some implementations, second-pass encoding the input frame may include identifying a current block of the input frame, identifying a corresponding motion vector from the first-pass encoding metrics, which may be a motion vector identified for a block from the reduced frame having a spatial location in the reduced frame corresponding to a spatial location of the current block in the input frame, and using the motion vector to perform motion searching by identifying a candidate reference block in a reference frame indicated by the motion vector, and searching the candidate reference block and neighboring blocks for a best matching block.

In some implementations, the coding unit 730 may output the second-pass encoded block as the encoded block for the input frame. For example, the coding unit 730 may include the second-pass encoded block in an output bitstream.

Figure 8:
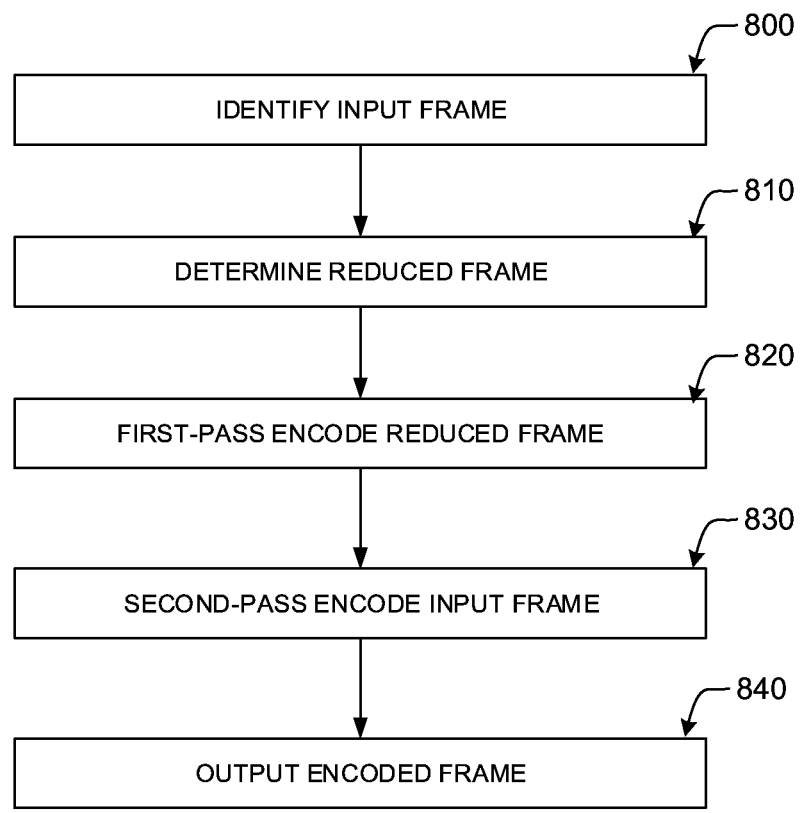
FIG. 8 is a flow diagram of a method of low-latency two-pass video coding in accordance with implementations of this disclosure.

FIG. 8 is a flow diagram of a method of low-latency two-pass video coding in accordance with implementations of this disclosure. Low-latency two-pass video coding may be implemented in a low-latency two-pass video coding unit, such as the low-latency two-pass video coding unit 700 shown in FIG. 7. In some implementations, low-latency two-pass video coding may include identifying an input frame at 800, determining a reduced frame at 810, first-pass encoding the reduced frame at 820, second-pass encoding the input frame at 830, output an encoded frame at 840, or a combination thereof.

In some implementations, an input frame may be identified at 800. Identifying an input frame may include receiving one or more input frames at a frame buffer, such as the frame buffer 710 shown in FIG. 7, and buffering the input frames.

In some implementations, a reduced frame may be generated at 810. In some implementations, generating a reduced frame at 810 may include receiving the input frame at resizing unit, such as the resizing unit 720 shown in FIG. 7, from a frame buffer, such as the frame buffer 710 shown in FIG. 7. In some implementations, generating a reduced frame at 810 may include cropping the input frame, scaling the input frame, or cropping and scaling the input frame.

In some implementations, the reduced frame may be first-pass encoded at 820. In some implementations, a coding unit, such as the coding unit 730 shown in FIG. 7, may first-pass encode the reduced frame at 820. In some implementations, first-pass encoding the reduced frame at 820 may include generating first-pass coding metrics based on first-pass encoding the reduced frame. Although not shown separately in FIG. 8, in some implementations, the first-pass coding metrics may be analyzed, such as by an analysis unit, such as the analysis unit 740 shown in FIG. 7, to identify second-pass coding parameters for second-pass encoding the input frame at 830.

In some implementations, the input frame may be second-pass encoded at 830. In some implementations, the coding unit may receive the input frame from the frame buffer and may receive second-pass coding parameters, such as from the analysis unit, based on first-pass encoding the reduced frame at 820, and may second-pass encode the input frame using the second-pass coding parameters. In some implementations, second0-pass encoding may include generating an encoded frame, and the encoded frame may be output at 840.

Figure 9:
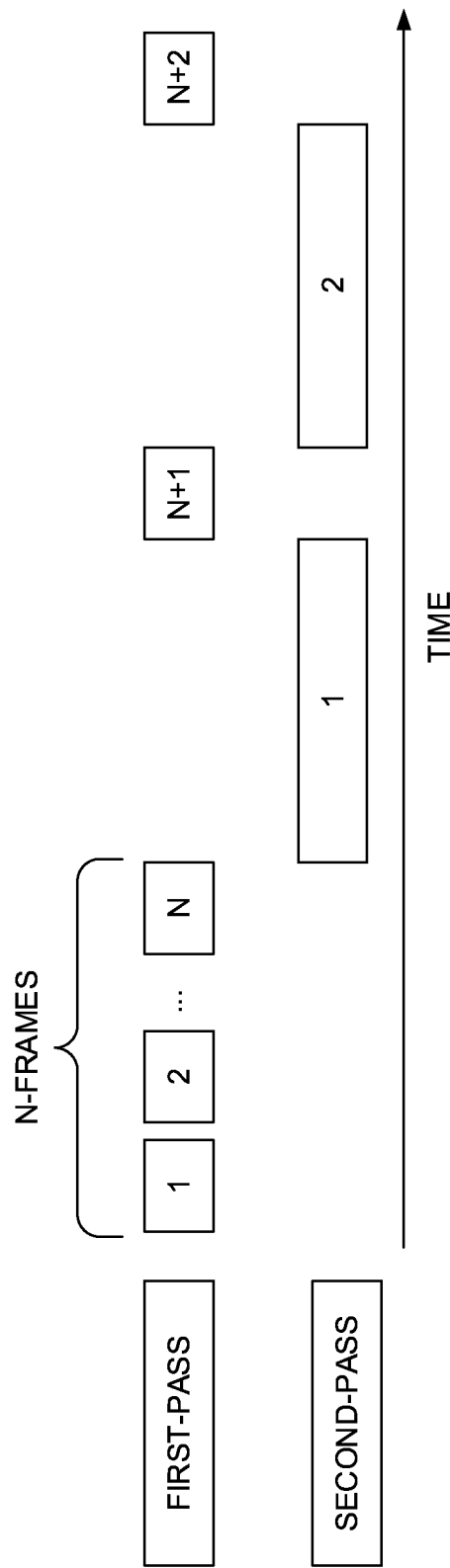
FIG. 9 is a diagram of an example of buffering for low-latency two-pass video coding in accordance with implementations of this disclosure.

FIG. 9 is a diagram of an example of buffering for low-latency two-pass video coding in accordance with implementations of this disclosure. In some implementations, low-latency two-pass video coding may include buffering a defined number, or cardinality, of input frames. For example, a frame buffer, such as the frame buffer 710 shown in FIG. 7, may buffer input frames.

In some implementations, buffering frames may include first-pass encoding a defined number N, or cardinality, of frames prior to second-pass encoding a first frame. In an example, as shown, the low-latency two-pass video coding unit may first-pass encode frames 1 to N. Subsequent to first-pass encoding frame N the low-latency two-pass video coding unit may second-pass encode frame 1. Subsequently, the low-latency two-pass video coding unit may first-pass encode frame N+1. Subsequently the low-latency two-pass video coding unit may second-pass encode frame 2. Subsequently the low-latency two-pass video coding unit may first-pass encode frame N+2.

Figure 10:
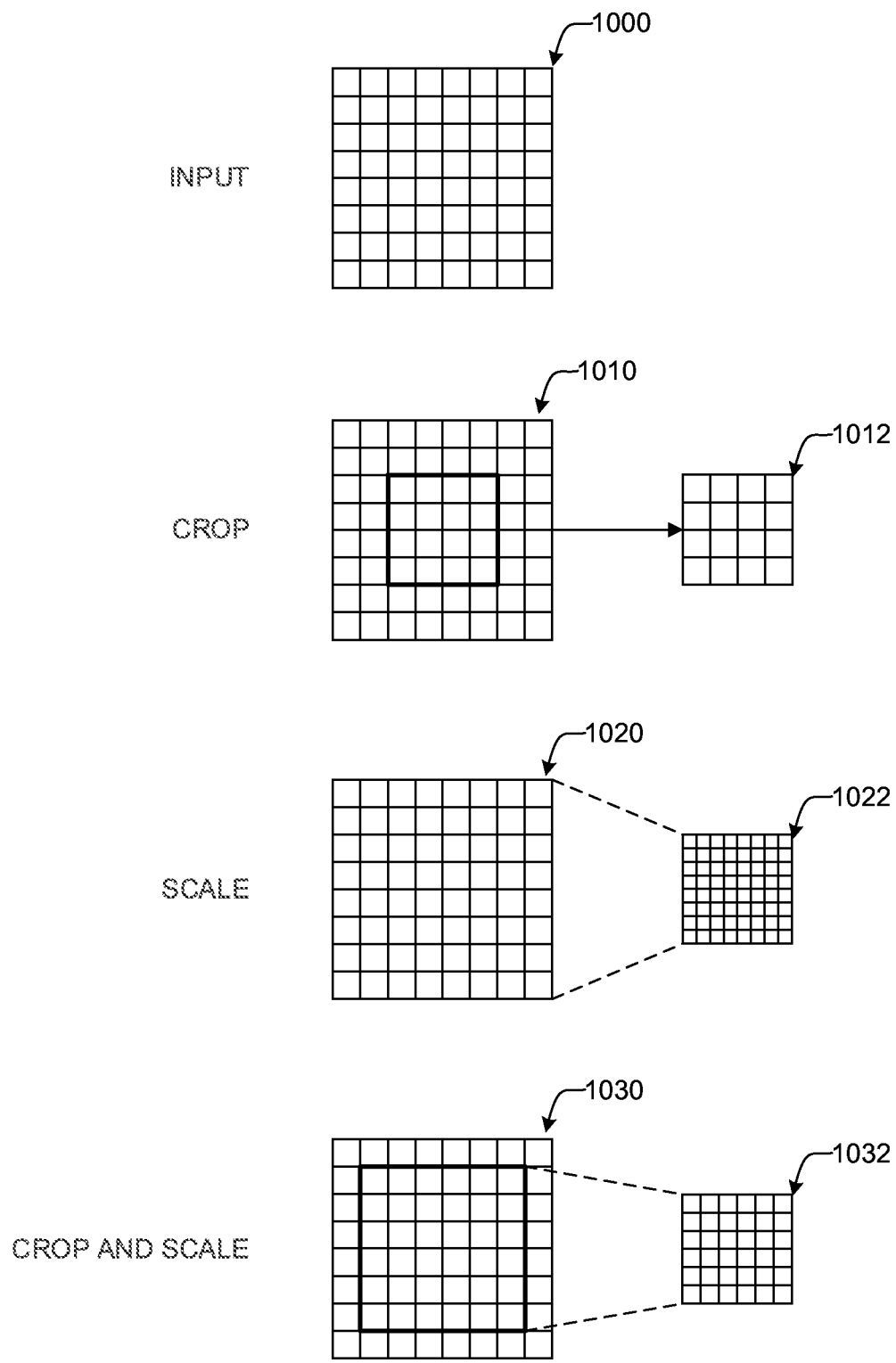
FIG. 10 is a diagram of examples of generating a reduced frame for low-latency two-pass video coding in accordance with implementations of this disclosure.

FIG. 10 is a diagram of examples of generating a reduced frame for low-latency two-pass video coding in accordance with implementations of this disclosure. In some implementations, low-latency two-pass video coding may include generating a reduced frame, such as shown at 810 in FIG. 8. For example, a frame resizing unit, such as the resizing unit 720 shown in FIG. 7, may generating a reduced frame from an input frame.

In some implementations, generating a reduced frame may include cropping the input frame. Cropping the input frame may include identifying a portion of the input frame, spatially smaller than the input frame as indicated by the thick black boarder shown at 1010, and using the information from the input frame in the identified portion as the cropped frame 1012. Although the size of the cropped frame 1012 is shown in FIG. 10 as being half the size of the input frame, any size cropped frame, smaller than the input frame, may be used. Although the cropped portion is shown at the center of the input frame at 1010, the cropped portion may be identified anywhere within the frame.

In some implementations, generating a reduced frame may include scaling, or sub-sampling, the input frame. In some implementations, scaling the input frame may include identifying a resolution of the input frame as shown at 1020, identifying a reduced resolution, less than the input resolution, and generating a reduced frame 1022 having the reduced resolution based on the input frame. The reduced frame 1022 is shown in FIG. 10 as being spatially smaller than the input frame 1020 to indicate that that the reduced frame 1022 includes less information; however, the reduced frame 1022 may be spatially concurrent with the input frame 1020.

In some implementations, generating a reduced frame may include cropping and scaling the input frame. For example, a portion of the input frame, spatially smaller than the input frame, may be identified, as indicated by the thick black boarder shown at 1030, and the information from the input frame in the identified portion may be scaled to generate the cropped frame 1032.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
   identifying an input frame from an input video stream;
   determining a reduced frame from the input frame, the reduced frame having a size smaller than a size of the input frame;
   encoding the reduced frame using a first encoder, wherein encoding the reduced frame includes generating a plurality of encoding metrics;
   generating a plurality of encoding parameters based on the plurality of encoding metrics;
   generating an encoded frame by encoding the input frame using the first encoder and at least one encoding parameter from the plurality of encoding parameters;
   including the first encoded frame in an output bitstream; and
   storing or transmitting the output bitstream.

2. The method of claim 1, wherein determining the reduced frame from the input frame includes cropping the input frame.

3. The method of claim 1, wherein determining the reduced frame from the input frame includes scaling the input frame.

4. The method of claim 1, wherein determining the reduced frame from the input frame includes cropping and scaling the input frame.

5. The method of claim 1, wherein the plurality of encoding metrics includes one or more of a global motion vector for encoding the reduced frame, a cardinality of a plurality of intra-coded blocks for encoding the reduced frame, a cardinality of a plurality of skipped blocks for encoding the reduced frame, a cardinality of a plurality of zero-motion blocks for encoding the reduced frame, or a distribution of reference frames for encoding the reduced frame.

6. The method of claim 1, wherein encoding the reduced frame includes:
   identifying a first block from the reduced frame; and
   identifying a motion vector for encoding the first block.

7. The method of claim 6, wherein encoding the input frame includes:
   identifying a second block from the input frame, the second block spatially corresponding to the first block; and
   on a condition that the motion vector exceeds a motion threshold, using a motion search area for motion estimation for the second block identified based on the motion vector.

8. The method of claim 1, wherein identifying the input frame from the input video stream includes buffering a plurality of input frames from the input video stream, the plurality of input frames including the input frame.

9. A method comprising:
   identifying an input frame from an input video stream, wherein the input frame includes an input block;
   determining a reduced frame from the input frame, the reduced frame having a size smaller than a size of the input frame, wherein the reduced frame includes a reduced block spatially corresponding to at least a portion of the input block;
   encoding, by a first encoder, the reduced frame, wherein encoding the reduced frame includes generating a plurality of encoding metrics, wherein generating the plurality of encoding metrics includes identifying a motion vector for encoding the reduced block;

generating a plurality of encoding parameters based on the plurality of encoding metrics;

generating, by the first encoder, an encoded frame by encoding the input frame based on at least one encoding parameter from the plurality of encoding parameters, wherein encoding the input frame includes, on a condition that the motion vector exceeds a motion threshold, using a motion search area for motion estimation for the input block, wherein the motion search area is identified based on the motion vector;

including the encoded frame in an output bitstream; and storing or transmitting the output bitstream.

10. The method of claim 9, wherein determining the reduced frame from the input frame includes cropping the input frame.

11. The method of claim 9, wherein determining the reduced frame from the input frame includes scaling the input frame.

12. The method of claim 9, wherein determining the reduced frame from the input frame includes cropping and scaling the input frame.

13. The method of claim 9, wherein the plurality of encoding metrics includes one or more of a global motion vector for encoding the reduced frame, a cardinality of a plurality of intra-coded blocks for encoding the reduced frame, a cardinality of a plurality of skipped blocks for encoding the reduced frame, a cardinality of a plurality of zero-motion blocks for encoding.

14. The method of claim 9, wherein identifying the input frame from the input video stream includes buffering a plurality of input frames from the input video stream, the plurality of input frames including the input frame.

15. A method comprising:

identifying an input frame from an input video stream;

determining a reduced frame from the input frame, the reduced frame having a size smaller than a size of the input frame, wherein determining the reduced frame from the input frame includes cropping the input frame, scaling the input frame, or cropping and scaling the input frame;

encoding, using a first encoder, the reduced frame, wherein encoding the reduced frame includes generating a plurality of encoding metrics;

generating at least one encoding parameter based on the plurality of encoding metrics;

generating, using the first encoder, an encoded frame by encoding the input frame using the at least one encoding parameter;

including the first encoded frame in an output bitstream; and storing or transmitting the output bitstream.

16. The method of claim 15, wherein the at least one encoding parameter includes one or more of a global motion vector for encoding the reduced frame, a cardinality of a plurality of intra-coded blocks for encoding the reduced frame, a motion vector field uniformity metric, a cardinality of a plurality of skipped blocks for encoding the reduced frame, a cardinality of a plurality of zero-motion blocks for encoding the reduced frame, or a distribution of reference frames for encoding the reduced frame.

17. The method of claim 15, wherein encoding the reduced frame includes:

identifying a first block from the reduced frame; and identifying a motion vector for encoding the first block;

and wherein encoding the input frame includes:

identifying a second block from the input frame, the second block spatially corresponding to the first block, and on a condition that the motion vector exceeds a motion threshold, using a motion search area for motion estimation for the second block identified based on the motion vector.

\* \* \* \* \*